April 10, 1962 LA VERN B. MYERS 3,029,107
HEADREST
Filed May 19, 1960 2 Sheets-Sheet 1

LaVern B. Myers
INVENTOR

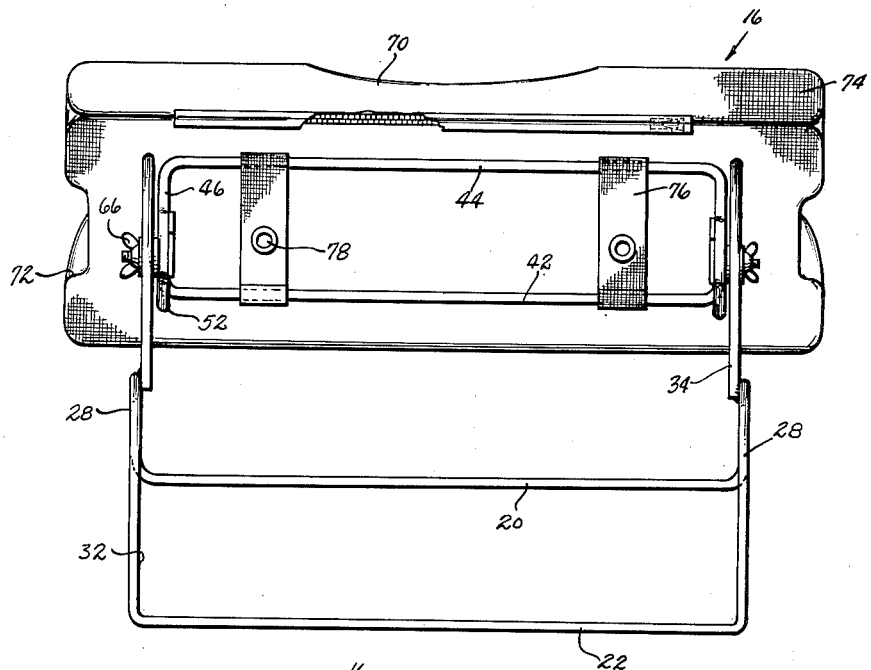
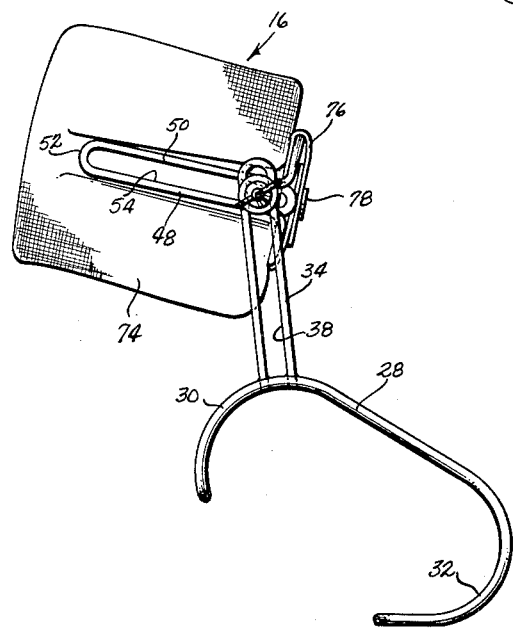
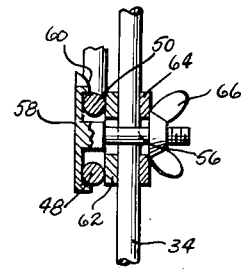
LaVern B. Myers
INVENTOR

United States Patent Office 3,029,107
Patented Apr. 10, 1962

3,029,107
HEADREST
La Vern B. Myers, 3350 Winola St., Salem, Oreg., assignor of one-third to Arthur P. Martin, Salem, Oreg.
Filed May 19, 1960, Ser. No. 30,166
5 Claims. (Cl. 297—399)

The present invention generally relates to a headrest construction of a portable nature adapted to be mounted on the top edge of the back of a seat such as an automobile seat or a similar seat on an airplane, train, bus or the like and also adapted to be received on the top edge of the back of a stuffed chair or the like thereby enabling the headrest to be employed in many different utilities with the portable nature of the invention enabling it to be readily conveyed to the various areas of use.

The primary object of the present invention is to provide a headrest having a novel means for attachment to the top edge of a seat back which enables it to be readily attached and removed therefrom together with a novel means for adjusting the position of the headrest so that it is in optimum position for supporting the head of the person using the device.

Another object of the present invention is to provide a headrest having a cushion thereon enabling the cushion to be detachably connected to the frame and also providing a cover for the cushion which may be removed therefrom for ease of laundering of the cover thereby maintaining the device clean and neat.

Another important feature of the present invention is the novel manner of attaching the cushion to the frame whereby the cushion may be extended from the frame or partly received within the confines of the frame.

Still another object of the present invention is to provide a headrest which is simple in construction, easy to use, effectively employed in many different uses, portable in nature and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a rear view of the headrest illustrating the manner of attaching the headrest to the frame;

FIGURE 4 is a detailed sectional view taken substantially upon a plane passing along section line 4—4 of FIGURE 3 illustrating the construction of the adjustable hinge joint interconnecting the components of the frame; and FIGURE 5 is a side elevational view of the headrest of the present invention illustrating the cushion partially received within the frame.

Referring now specifically to the drawings, the numeral 10 generally designates the headrest of the present invention for mounting on the top edge of the back of a seat 12 which may be the back of a vehicle seat such as an automobile seat, airplane seat, bus seat or train seat or may be the back of a stuffed chair or the like for providing support for the head of a person using the device.

Figure 3:
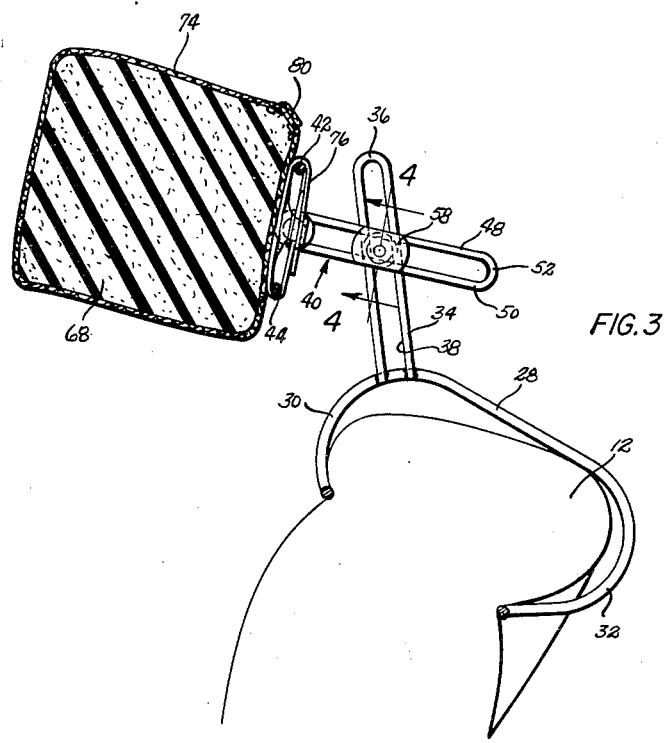
FIGURE 3 is a detailed sectional view taken substantially upon a plane passing along section line 3—3 of FIGURE 1 illustrating the details of construction of the headrest.

The headrest includes a frame generally designated by the numeral 14 and a cushion generally designated by the numeral 16 detachably connected thereto. The frame 14 includes an elongated mounting member 18 having a generally U-shaped cross-sectional configuration as seen in FIGURE 3. The mounting member 18 includes a pair of parallel rods 20 and 22 having the ends thereof interconnected by generally U-shaped end rods 24 and 26, each having an elongated bight portion 28 and inwardly curved ends 30 and 32. As illustrated in FIGURE 3, the end portions 32 are curved inwardly to a greater degree than the end portions 30 for engaging with and clamping into the rear surface of the seat back 12 thus securely retaining the mounting member 18 in position but enabling ready detachment thereof. In mounting the mounting member, it is engaged with the seat back 12 in an obvious manner, that is, by engaging one of the rods with one surface of the seat and then pivoting and forcing the other rod downwardly into engagement with the other surface of the seat back.

Extending upwardly from the forward upper corner portion of each of the end rods 24 and 26 is a pair of parallel rods 34 interconnected by a U-shaped portion 36 at their upper end. The parallel rods 34 are relatively closely spaced and form a slot 38 therebetween. The parallel rods 34 may be considered a bracket and they are rigidly attached to the end members 24 and 26 respectively as by welding or any other suitable fastening means.

Pivotally and adjustably attached to the brackets formed by the rods 34 is a carrier generally designated by the numeral 40 which includes a generally rectangular mounting portion constituted by a pair of parallel rods 42 and 44 extending parallel to the rods 20 and 22. The ends of the rods 42 and 44 are turned inwardly towards each other as indicated by the numeral 46 and then are formed to provide a pair of closely spaced parallel rods 48 and 50 interconnected by a relatively short U-shaped portion 52. The rods 48 and 50 are spaced apart a distance equal to the rods 34 and form a slot 54 therebetween equivalent in width to the slot 38. The rods 50 and 48 are continuous with the inwardly extending portions 46 of the rods 42 and 44 respectively thereby providing a one-piece construction for the carrier 40.

In assembling the carrier 40 to the mounting member 18, there is provided a hinge bolt 56 extending through the slots 54 and 38 respectively. The hinge bolt 56 is provided with an enlarged flat head 58 having inwardly extending projections 60 thereon engaging opposite surfaces of the rods 48 and 50. Disposed on the bolt 56 is a pair of washers 62 and 64 disposed on either side of the rods 34 and a wing nut 66 is provided on the outer end of the bolt 56 thereby securely clamping the rod members 34 in adjusted relation to the rod members 48 and 50. With this construction, the bolt 56 not only forms a hinge axis for pivoting the mounting member 40 about a transverse axis but also enables adjustment of the bolt 56 throughout the length of the slot 54 and throughout the length of the slot 38 thereby providing a maximum degree of adjustment between the carrier 40 and the mounting member 18.

The cushion 16 includes a body of resilient material or cushioning material 68 of foam rubber or the like which may be contoured by the provision of a concave central area 70 in the front face thereof and notches 72 in each end thereof. The cushion 68 is provided with a cover 74 of any suitable material with the rear edge of the cover having a pair of loops 76 attached thereto, the loops being in the form of a pair of straps interconnected by snap fastener elements 78 for wrapping around the spaced rods 42 and 44 for detachably mounting the cushion in position. Also, the cover 74 is provided with a longitudinal slit therein normally closed by a slide fastener assembly 80 which enables the cover 74 to be removed from the cushion 78 for ease of laundering or the like and also enabling the cover to be replaced for changing the decorative qualities of the cushion.

Figure 1:
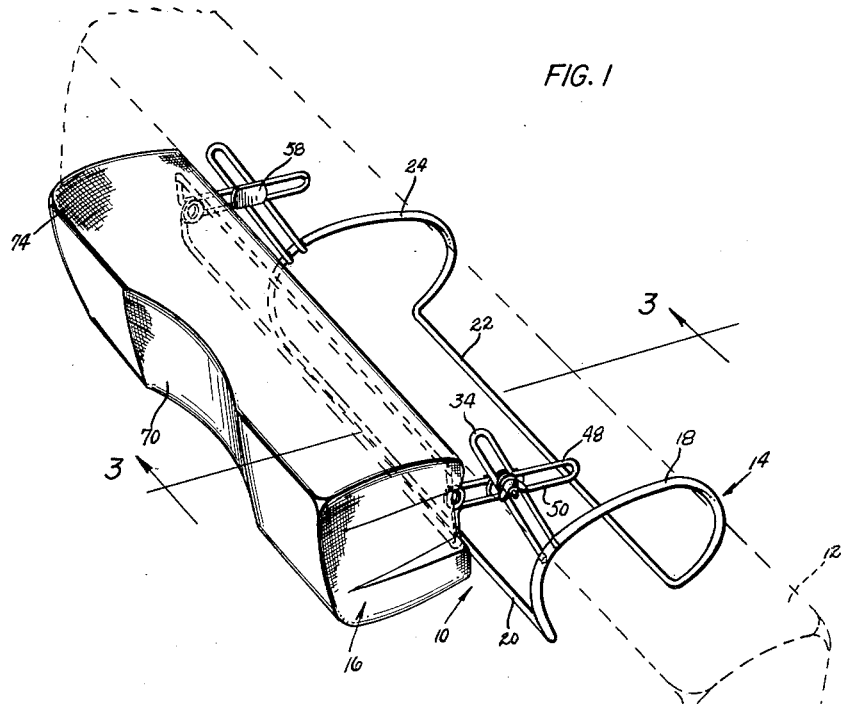
FIGURE 1 is a perspective view of the headrest of the present invention mounted on the back of a seat.

As illustrated in FIGURE 1, the cushion 16 may be mounted on the frame 14 in such a manner that the cushion extends completely outwardly from the mounting rods 42 and 44. This is desirable when the person wishes to sit upright such as when the person is operating an automobile. The cushion will immediately engage the head of such a person thus enabling the person to relax somewhat. As illustrated in FIGURE 5, the cushion 16 is attached to the carrier 40 with the rods 48 and 50 received within the end recesses 72 thus orienting the cushion 16 closer to the mounting member 18 and enabling support of the head by persons reclining in the chair or seat.

The frame of the device may be rendered attractive by constructing the device from a highly polished material, chrome plated or the like, and the entire device is easily moved from seat to seat. In use in an automobile, the device is quite effective to prevent "whiplash" which is a neck injury caused when the automobile is struck in the rear by another vehicle. The particular arrangement of the structural components of the mounting member 18 enables it to effectively counteract any rearward force exerted on the cushion by the person's head thus providing a sturdy and secure headrest which is easily removable and portable and which may be adjusted as to vertical height, horizontal position and angular orientation when the cushion is disposed in either of two positions, that is extending from the carrier or partially received within the carrier.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A headrest for attachment to the upper edge of the back of a seat comprising a mounting member of generally inverted U-shaped configuration for engagement with the upper edge of the back of a seat, a carrier disposed in generally parallel relation to the mounting member, means interconnecting the carrier and mounting member for bodily adjustment in a vertical plane and horizontal plane and for pivotal movement about a transverse axis, and a cushion mounted on said carrier whereby the cushion may be bodily adjusted vertically, horizontally and swung in an arcuate path, said carrier including a pair of parallel rods having inturned end portions, said end portions including a pair of offset U-shaped members defining a portion of the connecting means between the carrier and the mounting member, said cushion being of resilient material and normally slightly longer than the distance between the elongated rods for extending beyond the elongated rods when mounted on the opposite side therefrom from the offset portions, said cushion being compressed slightly for reception between the offset portions when disposed therebetween, the ends of said cushion including recesses receiving the offset portions whereby the recesses will position the cushion between the offset members, and means detachably connecting the cushion to the carrier intermediate the offset portions.

2. A headrest for the back of a seat comprising a skeleton frame including a mounting member having a pair of parallel spaced rods interconnected by arcuate end members whereby the rods engage the forward and rear surface of the seat back at vertically spaced points to prevent arcuate movement of the mounting member rearwardly in relation to the seat back, a narrow U-shaped rod attached to each end member, a carrier including a pair of narrow U-shaped rods interconnected by parallel mounting rods, the U-shaped rods on the carrier intersecting the U-shaped rods on the mounting member, fastener means extending through the slots formed by the slots of the intersecting rods, and a cushion carried by the parallel mounting rods whereby the position of the cushion may be adjusted universally in relation to the seat back.

3. A headrest for the back of a seat comprising a mounting member engaging the front and rear surface of a seat below the top edge thereof along horizontally elongated areas, a pair of upwardly extending parallel brackets carried by said mounting member, a substantially U-shaped carrier including an elongated bight portion and parallel legs extending in intersecting relation to the brackets on the mounting member, means connecting the legs of the carrier to the brackets of the mounting member for providing pivotal movement of the carrier, sliding movement of the legs in relation to the brackets and sliding movement of the legs in relation to the connecting means, a cushion engaging the bight portion of the carrier, means on the cushion for detachably supporting the cushion from the carrier whereby the cushion may be supported against the surface of the bight portion of the carrier remote from the legs or against the surface of the bight portion between the legs whereby the cushion will be received between the legs of the carrier for effectively adjusting the position of the cushion in relation to the back of the seat.

4. A headrest for the back of a seat comprising a mounting member engaging the front and rear surface of a seat below the top edge thereof at horizontally spaced areas, a pair of upwardly extending parallel brackets carried by said mounting member, a substantially U-shaped carrier including an elongated bight portion and parallel legs extending in intersecting relation to the brackets on the mounting member, means connecting the legs of the carrier to the brackets of the mounting member for providing pivotal movement of the carrier, sliding movement of the legs in relation to the brackets and sliding movement of the legs in relation to the connecting means, a cushion extending substantially throughout the length of the bight portion of the carrier, and means on the cushion detachably supporting the cushion from the carrier, each of said brackets and legs having an elongated slot therein with the slots in the legs being in intersecting relation to the slots in the brackets, said means connecting the legs and brackets including adjustable fastener means extending through the intersecting slots for releasably locking the carrier in adjusted relation to the mounting member.

5. A headrest for the back of a seat comprising a mounting member including a pair of spaced arcuate end members having spaced ends for engaging the forward and rear surfaces of the seat back to prevent arcuate movement of the mounting member in relation to the seat back, rod means rigidly interconnecting said end members, a narrow U-shaped rod attached to each end member, a carrier including a pair of narrow U-shaped rods interconnected by cushion mounting rod means, the U-shaped rods on the carrier intersecting the U-shaped rods on the mounting member, fastener means extending through the slots formed by the intersecting U-shaped rods, and a cushion carried by the cushion mounting rod means whereby the position of the cushion may be adjusted universally in relation to the seat back.

References Cited in the file of this patent

UNITED STATES PATENTS

| | | |
|---|---|---|
| 242,380 | Sharp | May 31, 1881 |
| 344,726 | Dolton | June 29, 1886 |
| 497,697 | Wesson | May 16, 1893 |
| 818,854 | Rossdam | Apr. 24, 1906 |
| 1,015,812 | Madsen | Jan. 30, 1912 |
| 1,597,355 | Fussell | Aug. 24, 1926 |
| 2,897,878 | Mungovan | Aug. 4, 1959 |
| 2,997,338 | Mirow | Aug. 22, 1961 |